United States Patent
Hu et al.

(10) Patent No.: US 9,369,409 B2
(45) Date of Patent: Jun. 14, 2016

(54) END-TO-END HITLESS PROTECTION IN PACKET SWITCHED NETWORKS

(71) Applicant: NEC Laboratories America, Inc., Princeton, NJ (US)

(72) Inventors: Junqiang Hu, Princeton, NJ (US); Yoshinobu Ooto, Tokyo (JP); Kazuo Takagi, Tokyo (JP); Yoshiaki Aono, Tokyo (JP); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 102 days.

(21) Appl. No.: 14/307,573

(22) Filed: Jun. 18, 2014

(65) Prior Publication Data

US 2015/0043330 A1 Feb. 12, 2015

Related U.S. Application Data

(60) Provisional application No. 61/864,741, filed on Aug. 12, 2013.

(51) Int. Cl.
*H04L 12/939* (2013.01)
*H04L 12/721* (2013.01)
*H04L 12/735* (2013.01)
*H04L 12/703* (2013.01)
*H04L 12/723* (2013.01)
*H04L 12/801* (2013.01)

(52) U.S. Cl.
CPC .......... *H04L 49/557* (2013.01); *H04L 45/1283* (2013.01); *H04L 45/28* (2013.01); *H04L 45/50* (2013.01); *H04L 45/68* (2013.01); *H04L 45/70* (2013.01); *H04L 47/34* (2013.01)

(58) Field of Classification Search
CPC ... H04L 49/557; H04L 45/70; H04L 45/1283; H04L 47/34; H04L 45/28; H04L 45/50; H04L 45/68
See application file for complete search history.

(56) References Cited

U.S. PATENT DOCUMENTS

| | | | | |
|---|---|---|---|---|
| 6,519,226 B1* | 2/2003 | Kumar | ............... | H04L 12/5601 370/230 |
| 8,144,711 B1* | 3/2012 | Pegrum | ............... | H04L 12/4641 370/218 |
| 2005/0195815 A1* | 9/2005 | Chaudhuri | ............. | H04L 45/60 370/389 |
| 2005/0213594 A1* | 9/2005 | Klink | ...................... | H04L 12/24 370/428 |
| 2006/0153179 A1* | 7/2006 | Ho | ...................... | H04L 12/5601 370/386 |
| 2009/0061876 A1* | 3/2009 | Ho | ........................ | H04W 99/00 455/436 |
| 2009/0161678 A1* | 6/2009 | Huang | .................... | H04L 69/12 370/395.5 |
| 2009/0183034 A1* | 7/2009 | Houlihane | .......... | G06F 11/3636 714/45 |
| 2013/0132604 A1* | 5/2013 | Cohen | ................. | H04W 76/025 709/231 |
| 2014/0079074 A1* | 3/2014 | Tune | ....................... | H04L 12/46 370/401 |

* cited by examiner

Primary Examiner — Brian D Nguyen
(74) Attorney, Agent, or Firm — Joseph Kolodka

(57) ABSTRACT

A method and system are described for providing hitless protection in a packet switched network having source nodes and destination nodes. The method includes enabling a working path and a protecting path between the source and destination nodes. The working path is non-overlapping with respect to the protecting path. The method further includes replicating traffic in a given one of the source nodes to generate replicated traffic. The method also includes forwarding the traffic and the replicated traffic through a working path and a protecting path, respectively, from the given one of the source nodes to a particular one of the destination nodes. The method additionally includes delivering a hitless-protected service in the particular one of the destination nodes by selecting traffic packets received from either the working path or the protecting path.

18 Claims, 17 Drawing Sheets

| | 31 | 24 | 23 | 16 | 15 | 8 | 7 | 0 |
|---|---|---|---|---|---|---|---|---|
| | | | DA | | | DA | | |
| | | | SA | | | SA | | |
| | | TYPE(=0X8847) | | | | LSP LABEL | | |
| | LSP LABEL | TC | S | TTL | | PW LABEL | | |
| | PW LABEL | TC | S | TTL | 0000 | RESERVED | | |
| | SEQUENCE NUMBER | | | | DA | | | |
| | | | | | SA | | | |
| | | | SA | | | VLAN-TAG | | |
| | | | VLAN-TAG | | | TYPE(≠0X8847) | | |
| | | | PAYLOAD | | | PAYLOAD | | |

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0 0 0 0 0| Flags |FRG|  Length       |     Sequence Number     |
+-+-+-+-+-+-+-+-+-+-+-+-+-+-+-+-+-+-+-+-+-+-+-+-+-+-+-+-+-+-+-+-+
```
— 1000

FIG. 10

END-TO-END HITLESS PROTECTION IN PACKET SWITCHED NETWORKS

RELATED APPLICATION INFORMATION

This application claims priority to provisional application Ser. No. 61/864,741 filed on Aug. 12, 2013, incorporated herein by reference.

BACKGROUND

1. Technical Field

The present invention relates to signal processing, and more particularly to end-to-end hitless protection in packet switched networks.

2. Description of the Related Art

A packet switched network is a good candidate for next generation networks because of its service flexibility and bandwidth efficiency. It is believed that traditional time-division-multiplexing (TDM) services will eventually be transported over packet switched networks using pseudo-wire (PW) in the future. However, telecommunication carriers have very strict requirements for such TDM services, which is usually beyond the capability of a packet switched network. Such limitation slows the pace of migrating dedicated TDM networks to converged packet networks. A packet network has to improve its service availability/reliability and reduce its packet loss rate to enable this transition.

SUMMARY

These and other drawbacks and disadvantages of the prior art are addressed by the present principles, which are directed to end-to-end hitless protection in packet switched networks.

According to an aspect of the present principles, there is provided a method for providing hitless protection in a packet switched network having source nodes and destination nodes. The method includes enabling a working path and a protecting path between the source and destination nodes. The working path is non-overlapping with respect to the protecting path. The method further includes replicating traffic in a given one of the source nodes to generate replicated traffic. The method also includes forwarding the traffic and the replicated traffic through a working path and a protecting path, respectively, from the given one of the source nodes to a particular one of the destination nodes. The method additionally includes delivering a hitless-protected service in the particular one of the destination nodes by selecting traffic packets received from either the working path or the protecting path.

According to another aspect of the present principles, there is provided a system for providing hitless protection in a packet switched network having source nodes and destination nodes. The system includes a working path and a protecting path between the source and destination nodes. The working path is non-overlapping with respect to the protecting path. The system further includes a source node located traffic replicator for replicating traffic in a given one of the source nodes to generate replicated traffic. The system also includes one or more source node line cards for forwarding the traffic and the replicated traffic through a working path and a protecting path, respectively, from the given one of the source nodes to a particular one of the destination nodes. The system additionally includes one or more destination node line cards for delivering a hitless-protected service in the particular one of the destination nodes by selecting traffic packets received from either the working path or the protecting path.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 shows a network-network-interface (NNI) data packet format 700 to which the present principles can be applied, in accordance with an embodiment of the present principles;

FIG. 10 shows an exemplary Pseudo-Wire (PW) Multi-Protocol Label Switching (MPLS) control word 1000, in accordance with an embodiment of the present principles;

DETAILED DESCRIPTION OF PREFERRED EMBODIMENTS

Figure 1:
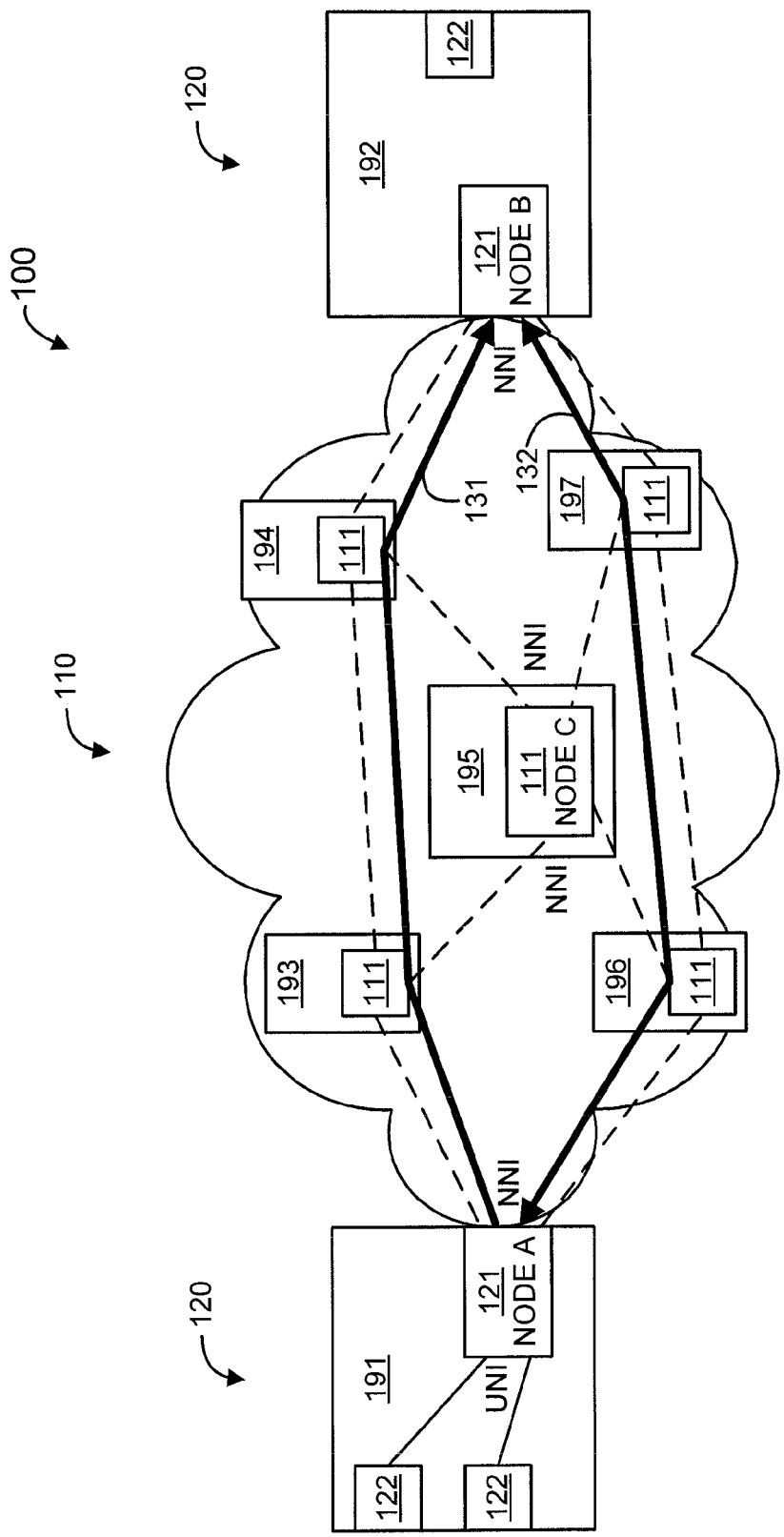
FIG. 1 shows a network architecture 100 to which the present principles can be applied, in accordance with an embodiment of the present principles.

The present principles are directed to end-to-end hitless protection in packet switched networks. Hitless protection relates to the ability of switching to a protecting mode without losing frame and framing synchronization when a failure occurs, to ensure that telecommunications equipment provide uninterrupted or continuous service and maintain an extremely high-reliability rating. This is achieved through 1+1 protection, in which traffic is processed the same way in a protecting path and a working path, and the protecting path carries the same traffic as the working path.

In an embodiment, a hitless protection scheme is proposed to avoid traffic loss in a packet switched network, and to deliver end-to-end, no loss, no duplication services to the connected client networks. At least the following three problems are solved by the present principles: (1) how to detect packet loss; (2) which packet to start from when switching from active path to the standby one; and (3) how to work with fabric protection In an embodiment, the present principles insert marker packets into data traffic for each hitless flow, either in periodic manner, or based on some other pattern (e.g., but not limited to, one marker for every fixed number of packets, or when the transmitted packets reaches a pre-defined number of bytes, and so forth). A traffic flow is defined as the traffic originated from the same source node (i.e., network ingress node), going to the same destination node (i.e., network egress node), with the same forwarding identifier (e.g., but not limited to, destination address or MPLS label, and so forth), and share the same forwarding policy (e.g., but not limited to, priority, bandwidth, and so forth). The marker packets are configured with the same forwarding header as the data packets, to make them have the same flow, so that they can be forwarded using the same path as the data packets and preserve the originated sequence. To distinguish marker packets from data packets, for transport using Multi-Protocol Label Switching-Transport Profile (MPLS-TP), one exemplary method corresponding to one exemplary embodiment is to encapsulate the marker packet using a pseudo-wire (PW) associated channel header (ACH). In another embodiment, the marker packets can be identified by, e.g., a specific flag value in a PW control word, using a specific inner label, by defining a specific TC value, and so forth.

Various embodiments of the present principles involve a "working path" and a "protecting path". In an embodiment, the term "working path" refers to the path that the receiver chooses the packets from under normal conditions and can be, for example, the path with shorter latency (with respect to the protecting path described hereafter). Moreover, in an embodiment, the term "protecting path" refers to the path that works as backup, in that the packets received from that path are discarded at the receiver in normal conditions and only used when the working path encounters failure or packet loss. However, in another embodiment, the working path and the protecting path are treated equally. The working path and the protecting path are further described herein.

On the receiver side, the hitless flows from both working and protecting paths are actively monitored, and checked with the marker packets. For the case that a marker packet provides the number of bytes or packets transmitted from the last marker packet, the receiver checks whether the received packet matches the number given in the marker packet. For the scheme of inserting a marker using criteria such as after a pre-defined number of packets or bytes, the receiver checks whether the received number of packets or bytes from the last marker meets the criteria. With this consistency checking scheme, the receiver determines whether the traffic paths (both working and protecting) work well, and decides whether it is needed to switch to the other (standby) path. The protection switching may fall at a marker packet, or the location where the packets start being lost in the active path and can be resumed from the standby one.

In terms of switch fabric, current telecommunication systems usually provide redundancy by adding one more fabric card. Consider one hundred percent redundancy, to avoid traffic loss in case of fabric failure, the present principles use the fabric in 1+1 mode at least for hitless traffic as follows: traffic to the working path (defined when a hitless flow is created) always passes through the working fabric (defined during system initialization); and traffic to the protecting path always passes through the protecting fabric. This solution actually extends the hitless path beyond the edge system switch fabric. Regular traffic may use the switch fabric either in 1:1 mode (one fabric in active mode, and the other one in standby mode which means no regular traffic passes through), or a dynamically load-balanced mode (the two fabrics are treated equally, and traffic is dynamically distributed to the two fabrics).

A description will now be given of a network architecture to which the present principles can be applied, in accordance with an embodiment of the present principles.

FIG. 1 shows a network architecture 100 to which the present principles can be applied, in accordance with an embodiment of the present principles. The network architecture 100 includes a core network 110 and multiple edge networks 120. It is to be appreciated that the terms "edge networks" and "access networks" as used interchangeably herein. The core network 110 includes core nodes 111. The edge networks 120 include edge nodes 121. The edge nodes 121 include edge node A and edge node B. In the embodiment of FIG. 1, each of the nodes 111 and 121 are associated with a respective entity which can be any type of entity. The entities include entities 191 through 197. The edge networks 120 also include client nodes 122.

Systems/networks are classified according to their connected networks. For example, the system connecting the edge network and the core network, or that connects two different carrier networks, is called the edge system/network 120. Moreover, the system connecting the core nodes 111 is called the core system/network 110.

For an edge node 121, the interface connecting the edge network 120 is called a user-network-interface (UNI); the interface connecting to the core network is called a network-network-interface (NNI). Network protection is usually provided from end-to-end (close to customer), or edge to edge. For either case, the network may have one working (primary) path plus a non-overlapped backup one for each traffic flow. These two paths are connected to different ports of a terminating node (e.g., the edge node 121 when the protection is edge to edge).

FIG. 1 shows exemplary traffic paths from edge node A to node B, where the line 131 represents the working path and line 132 for the backup one (protecting path). There are two protecting modes commonly seen: one mode is that only one path has traffic for the given flow; the other mode has duplicated traffic in both working and protecting paths. The former is called 1:1 (or 1:n if one path is used to protect multiple other paths) protection, and the latter is called 1+1 protection.

A description will now be given of hitless protection, in accordance with an embodiment of the present principles.

Hitless protection is the protection switching method to guarantee no traffic loss will be hit when failure occurs. The present principles provide the scheme to achieve end-to-end or edge-to-edge hitless protection, which means the hitless dedicated processing is executed only in the two ends (e.g., node A and node B in FIG. 1) of the primary and protecting paths. All the intermediate nodes handle the traffic transparently.

The following description assumes the protecting path is from one edge node to another edge node, though the idea can be applied to any two connected systems. Under this assumption, the involved line cards are named network ingress (i.e., source edge) UNI, network ingress NNI, network egress (i.e., destination edge) NNI, and network egress UNI respectively. We also assume the system is chassis-based which has a dedicated switch fabric, to connect input and output line cards, though the same idea can be applied to a "pizza box" system.

A description will now be given of an operational model, in accordance with an embodiment of the present principles.

Figure 2:
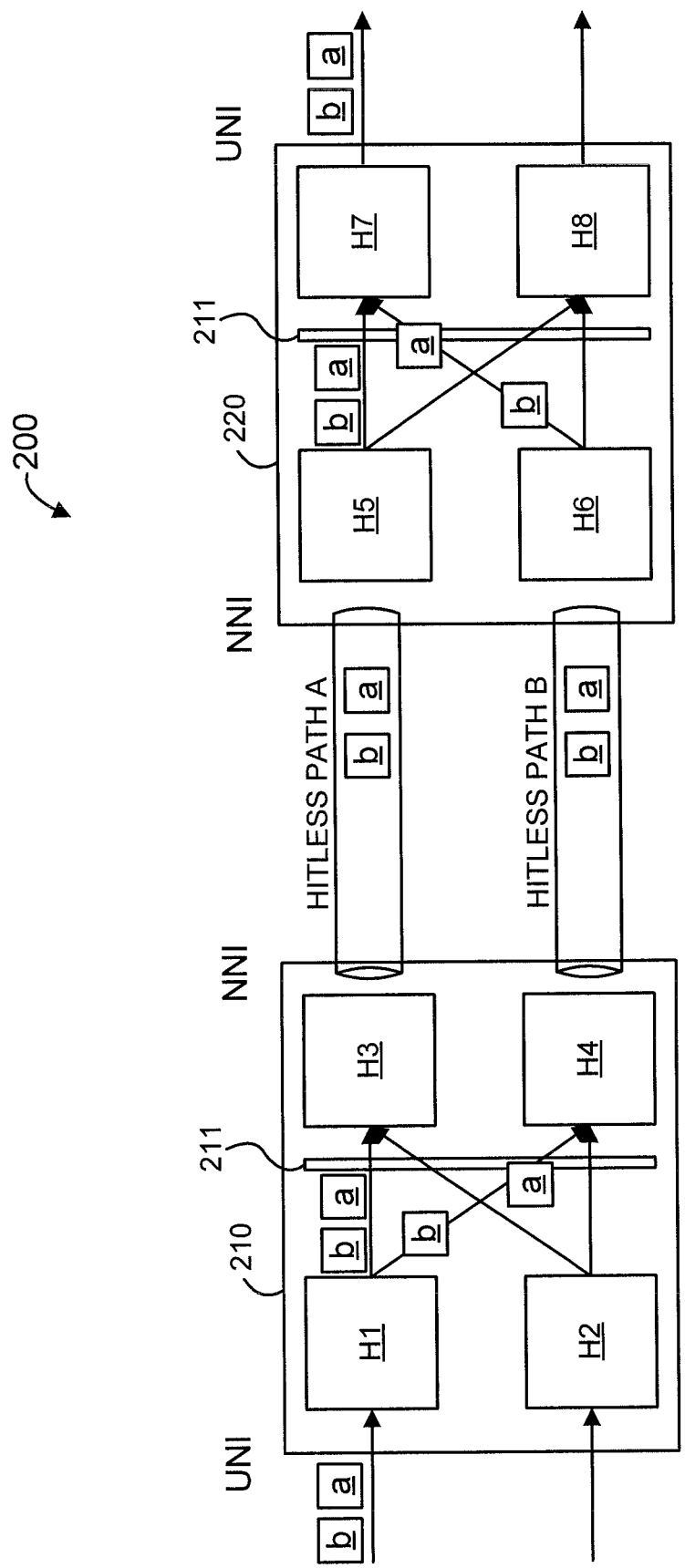
FIG. 2 shows a hitless protection model 200 for a system or network, in accordance with an embodiment of the present principles.

FIG. 2 shows a hitless protection model 200 for a system or network, in accordance with an embodiment of the present principles.

Figure 3:
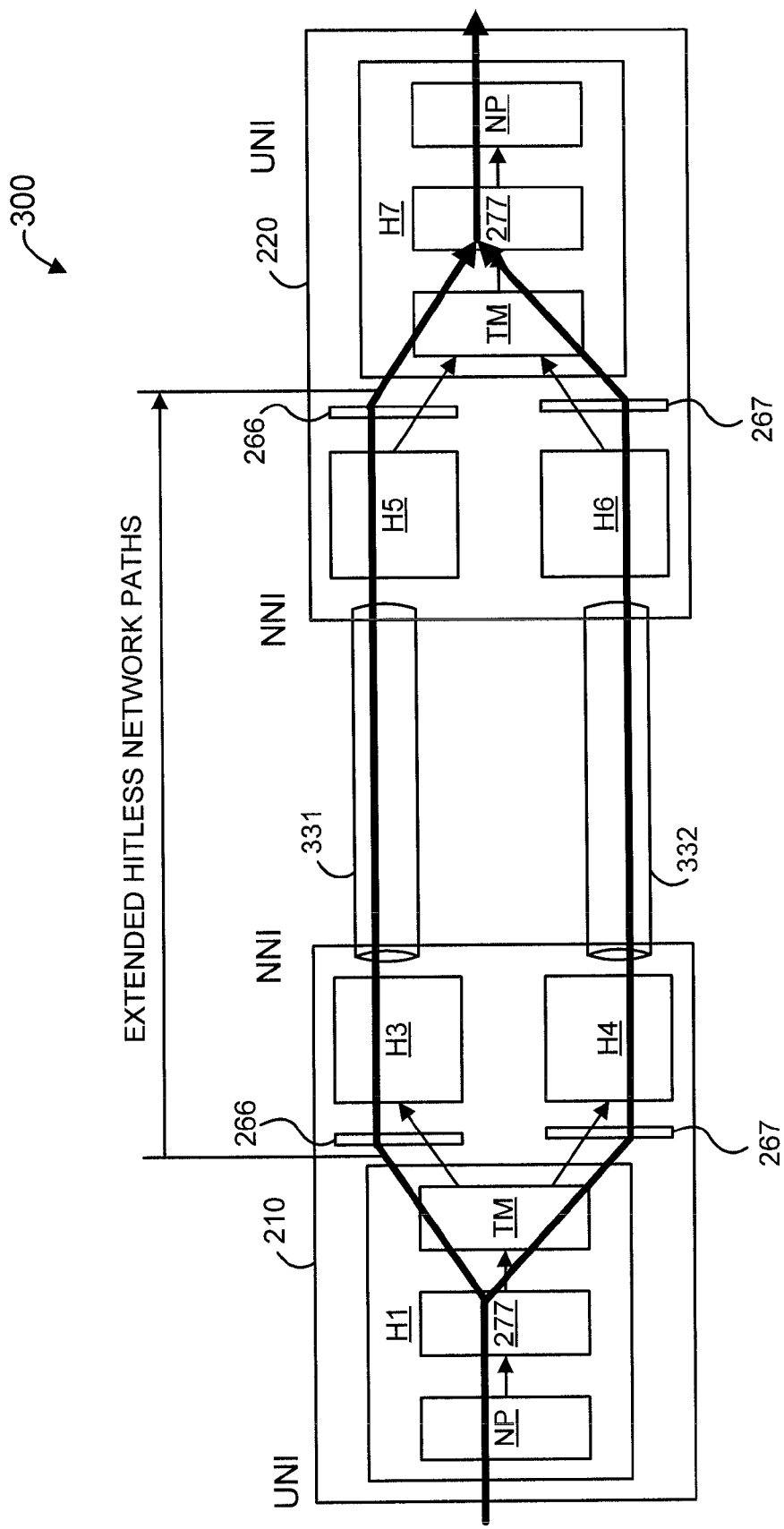
FIG. 3 shows an extended hitless network path 300 from network ingress node traffic managers (TMs) to network egress destination TMs, in accordance with an embodiment of the present principle.

The transmitter 210 is equivalent to edge node A in FIG. 1, and the receiver 220 on the right side is equivalent to node B in FIG. 1. Hence, the transmitter 210 corresponds to a source node, and the receiver 220 corresponds to a destination node. Hitless path A may represent the working path 131 in FIG. 1, while hitless path B may represent the protecting path 132. In the transmitter 210 (or network ingress system), H1 and H2 are line cards for the UNI interfaces. Further, in the transmitter 210, H3 and H4 are line cards for the NNI interfaces, respectively named working and protecting line cards for the specific hitless flow, and connected to hitless path A and B, respectively. The switch fabrics 211 of FIG. 2 are divided into working switch fabrics 266 and protecting switch fabric 267 as shown in FIG. 3. The 4 line cards in the transmitter 210 are interconnected by switch fabric(s) 266 and 267. The 4 line cards in the receiver 220 are interconnected by switch fabrics 266 and 267.

In the receiver 220 (or network egress system), line cards H5 and H6 are for the NNI interfaces while H7 and H8 are for the UNI connections. These 4 line cards are interconnected by switch fabric(s) 221.

For traffic received from the UNI interface in the source node, the UNI line card replicates the traffic before sending it to the switch fabric, and each copy is destined to one NM line card (H3 and H4 respectively). For example, packets a and b received in UNI interface are replicated by H1 for output line cards H3 and H4, respectively. The packets transmitted in path A and B are expected to be identical. In the receiver node, the hitless traffic from working and protecting paths are received by network egress NNI line cards H5 and H6, respectively. Both line cards forward the packets to the same UNI line card, i.e., H7. The output UNI line card selects the desired copy based on its configuration and monitored status (for example, packet loss information). Whenever it detects problem in the working path (e.g., packet loss), the UNI line card will immediately switch to the protecting path, given that the protecting path is working properly and protection is not in lockout mode.

To simplify fault probing in the receiver 220, marker packets can be used in the hitless flow, to provide the number of packets/bytes and/or other necessary information between each two marker packets. Such marker packets may be inserted in a fixed time interval, or based on traffic pattern or using some other criteria. Marker packets are inserted in an input (UNI) line card, or in an output (NNI) line card if protecting and working NNI line cards have way to synchronize with each other.

In a chassis system that uses separate line cards and switch fabric(s), a hitless functional block is usually located between a network processor (NP, or equivalent processor) and a traffic manager (TM, or equivalent processor). In such a system, the hitless functional block can be on either an input line card or an output line card. A flow is usually classified by the NP to be hitless or non-hitless, based on administrative configurations. The hitless block uses the decision from the NP to process those marked as hitless flows.

A description will now be given of an extended hitless path, in accordance with an embodiment of the present principles.

Telecommunication systems usually provide redundancy to the switch fabrics by adding one more fabric card. Commonly seen methods for this added redundancy are either putting one fabric card in hot standby mode, or operating all the fabric cards in load-balanced mode. In hot standby mode, we have the protecting (redundant) fabric card in ready (able to switch traffic in any time) but idle (no actual traffic passes through) state. In load-balanced mode, we treat all the fabric cards equally, and their switching capacity is dynamically shared by all the traffic. In the case of a fabric failure for hot standby mode, the protecting fabric card immediately takes over the failed one. In the case of a fabric failure in load-balanced mode, the traffic will be distributed to the working fabric only, with failed fabric isolated. To enable a fast recovery, usually the traffic manager works with the switch fabric to achieve automatic failure detection and service recovery; traffic is automatically routed/switched to the destination ports.

For hitless traffic, one drawback with the traditional solution is that both the working and protecting copies may pass through the same switch fabric. This can cause packet loss if that fabric happens to fail, so both copies will get lost. To avoid this situation, the switch fabric (including both the TM interface and the switch fabric card itself) can treat regular traffic and hitless traffic differently. For example, regular traffic is switched using traditional solution, while for hitless traffic, the fabrics are divided into "working" group and "protecting" group, where the working copy always goes through working group, and protecting copy always goes through protecting group. This is the concept of "extended hitless path". The "extended" working path 331 and the protecting "network path" 332 can be considered starting from network ingress fabric and ending at network egress fabric, as shown in FIG. 3 (H1~H7 have the same meaning as in FIG. 2). FIG. 3 shows an extended hitless network path 300 from network ingress node traffic managers (TMs) to network egress destination TMs, in accordance with an embodiment of the present principle. Either a single TM or multiple TMs are used for each line card, and they can be considered as two virtual TMs, each one with a dedicated TM port number(s). The reachability of each virtual TM is configured to connect to its corresponding fabric only, for hitless traffic. Regular traffic may use different TM port space from hitless traffic, so that this configuration does not put any constraint on regular traffic, to allow use of any traditional method.

A description will now be given of source node operation, in accordance with an embodiment of the present principles.

Traffic is classified by a network processor, either to be forwarded in a "regular way", or hitlessly protected. A hitless block uses the classification result to decide whether to pass the traffic transparently or with hitless-specific processing. In the source node, the main function of the hitless block is to insert marker packets into the hitless packet flow, replicate the hitless flow into two copies, and send the two copies to the working and protecting paths, respectively. The marker is inserted either before or after packets replication, for each hitless flow. After packet replication, a synchronization method may be used for the two copies, so that the marker is inserted in the same position for each copy. For systems using VOQ (Virtual Output Queue) scheduling, if the marker is inserted in the input port, the marker and data packets shall be stored in the same VOQ to preserve the correct sequence.

A description will now be given of marker insertion, in accordance with an embodiment of the present principles.

To enable the marker to follow the same path as the data packets, which is to guarantee the sequence in the receiver node, the marker packet shall have the same forwarding-related header. This header refers to all the label/protocol stacks and fields that will be handled in the intermediate nodes. The method is that, for each hitless flow, there is an entry in a table providing such header. The marker packet is generated directly from this common header, appended by marker content. Such entry can be created when the hitless flow is created.

We provide two exemplary methods to insert the marker packets. One method is to insert in a periodic way, based on a timer and the configuration for a particular hitless flow, irrespective of whether or not there is traffic. The other method is to insert a marker whenever the number of packets or bytes for that flow reaches a pre-configured threshold.

Figure 4:
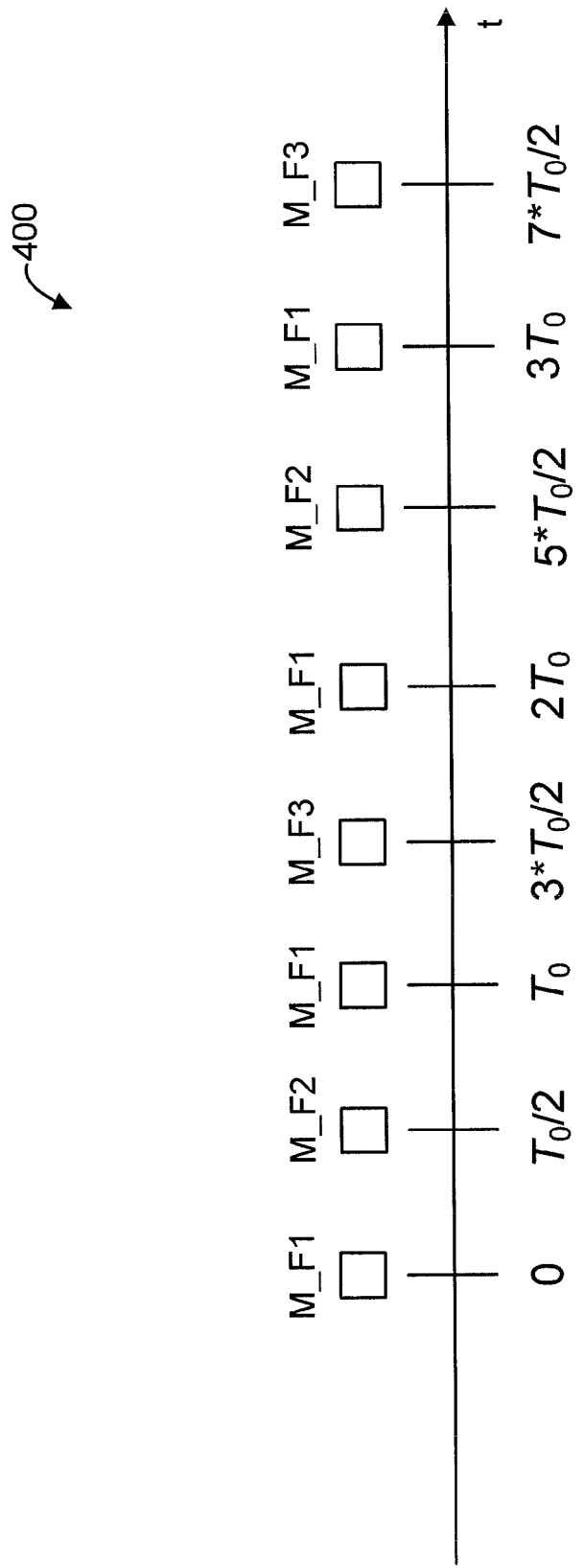
FIG. 4 shows an exemplary interleaved marker generation time configuration 400, in accordance with an embodiment of the present principles.

For the method inserting marker packets periodically, in an embodiment we can use the following two configuration parameters: one is the marker insertion interval; and the other is the time offset. "Interval" specifies the marker insertion frequency, while "offset" configures the starting time. The "offset" can be a particular value of a timer, or its last several bits. These parameters are generally configured when a hitless flow is created. To avoid congestion, marker insertion time is better to be non-overlapped among different flows. If there is a common minimal insertion time interval $T_0$ for all the flows, this can be achieved by configuring different offsets to each flow, to have the marker insertion time interleaved. FIG. 4 shows an exemplary interleaved marker generation time configuration 400, in accordance with an embodiment of the present principles. The configuration 400 includes and/or otherwise involves the following parameters:

Flow 1: marker insertion interval of $T_0$, offset 0;
Flow 2: marker insertion interval of $2*T_0$, offset $T_0/2$; and
Flow 3: marker insertion interval of $2*T_0$, offset $3*T_0/2$.

A description will now be given of a processing data structure with periodic marker insertion, in accordance with an embodiment of the present principles.

Figure 5:
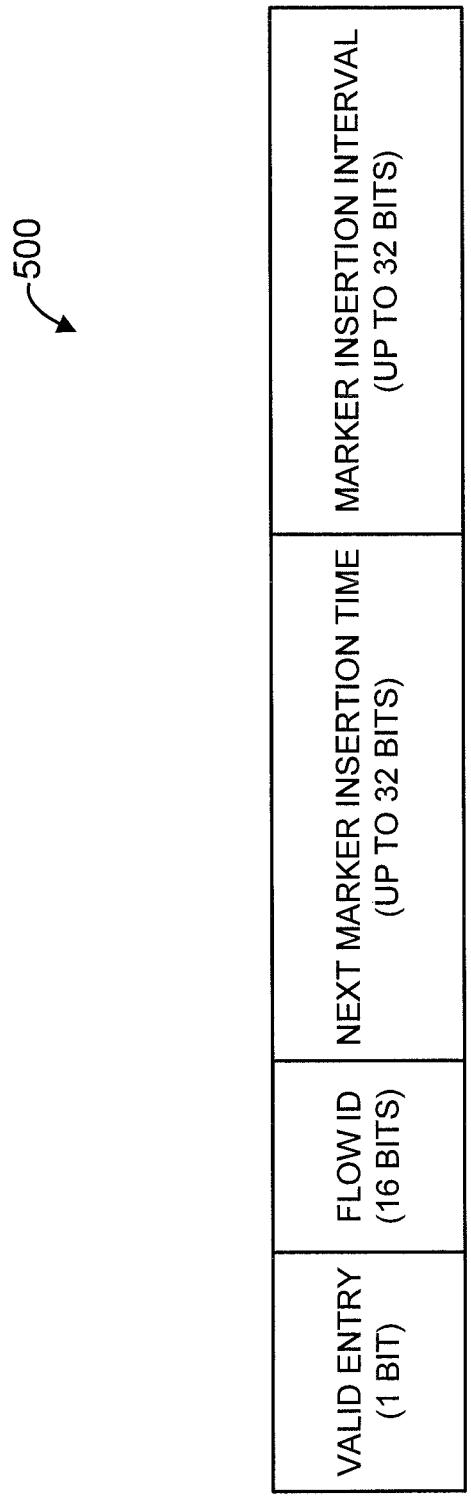
FIG. 5 shows an exemplary marker format 500, in accordance with an embodiment of the present principles.

For processing resource saving purposes, a table that is implemented in memory can be used to store the configuration and status for each flow. Each flow has one entry in this table. In one example, such entry includes the corresponding flow ID, next marker insertion time, and marker insertion interval, and so forth. A "valid" field can be added in this entry to identify whether or not there is such a flow. FIG. 5 shows an exemplary marker format 500, in accordance with an embodiment of the present principles. If the sequence number is used in the marker packet instead of a timestamp, a sequence field may exist in the table entry to indicate the sequence for the marker packet.

Figure 6:
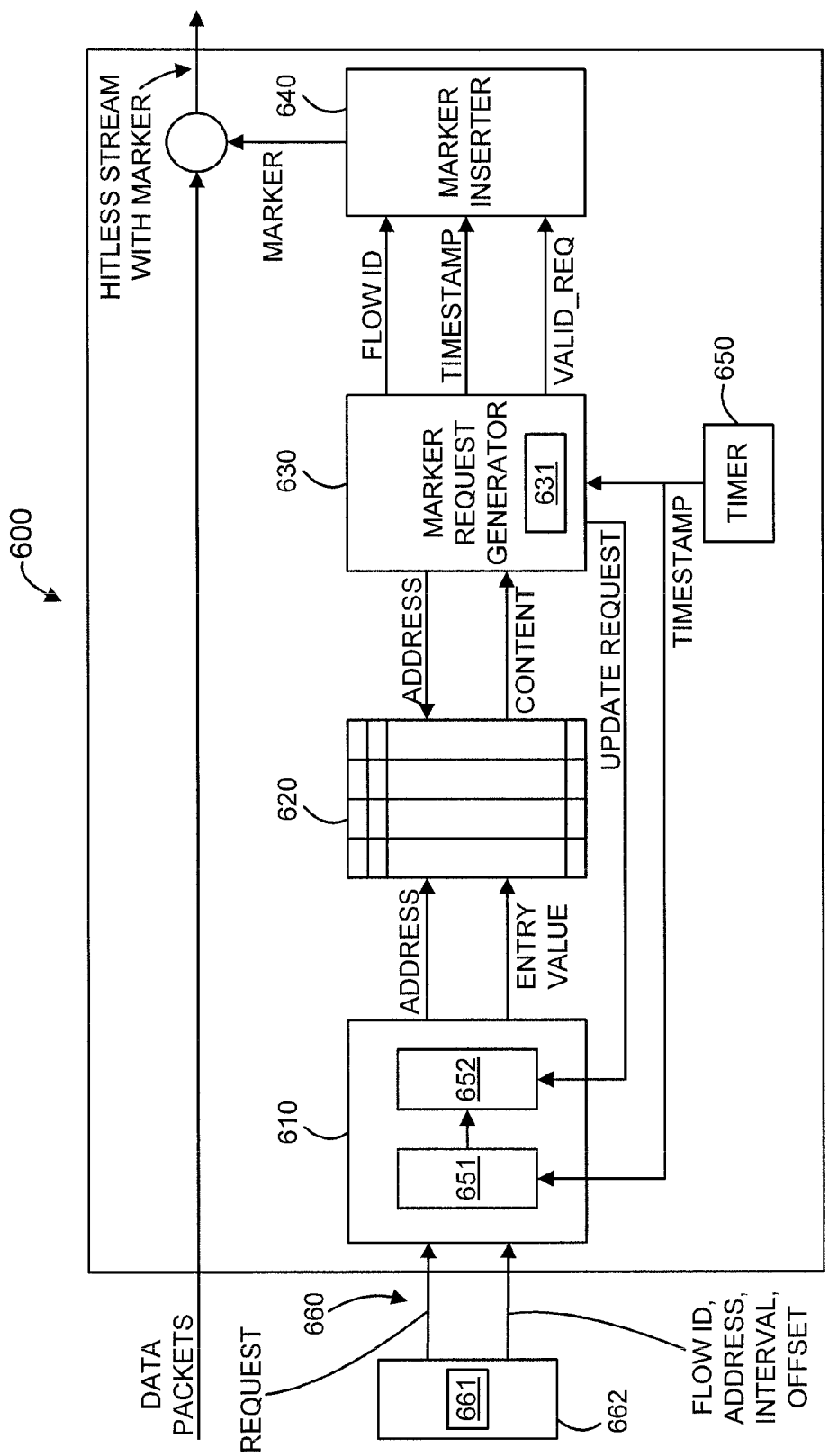
FIG. 6 shows an exemplary marker insertion device 600, in accordance with an embodiment of the present principles.

FIG. 6 shows an exemplary marker insertion device 600, in accordance with an embodiment of the present principles. The device uses dual-port memory for the table described with respect thereto. Of course, other types of memories can also be used, while maintaining the spirit of the present principles. The main processing blocks include a table entry updater 610, a marker table 620, a marker generation requester 630, a marker inserter 640, and a timer 650. The timer 650 can be either system centralized one, or line card dedicated. Table entry updater 610 includes an entry generator 651 and an arbitrator 652. Table entry updater 610 accepts a request from a CPU interface 660 of a CPU 662 and the marker generation requester 630, arbitrates between these requests using the arbitrator 652 and updates the marker table 620 accordingly. When a new hitless flow is to be created, the software 661 running in CPU 662 looks for an unused entry, generates an entry insertion request with an address, a flow ID, a marker insertion interval, and a marker insertion offset, to the updating interface 631 of the marker generation requester 630. While described as software, element 661 can also be implemented in hardware using, e.g., an application specific integrated circuit, and so forth. The updating interface 631 calculates the next marker insertion time based on insertion offset and current timer value (or "next marker insertion time"), and arbitrates between entry insertion request and updating request, to generate writing control to the table entry. When a hitless flow is to be removed, the software 661 simply generates a removal request with a corresponding entry address, so that the updating logic will write a "0" to a "valid entry" field to the specified address. An example marker table has the format as in FIG. 5. Of course, other formats can also be used, while maintaining the spirit of the present principles. The marker generation requester 630 continuously reads through the marker table 620, to decide whether it is time to generate a marker for a flow. If there is a flow to have a marker inserted, the marker generation requester 630 sends request (including flow ID, and timestamp value if needed) to marker inserter 640 which is responsible to insert a marker into the hitless flow. Whenever a marker insertion request is generated, the marker generation requester 630 also calculates the next marker insertion time and sends an updating request to table entry updater 610. The marker inserter 640 may have an associated table storing marker header, where from which it can copy the marker header.

If a marker packet is inserted based on the number of packets or bytes, the data structure and operation can be similar to that using the periodic manner. However, the marker table entry will be indexed by the flow ID, and it will have the number of packets or bytes passed, and the configured threshold. The passed number is cleared to zero when the flow is initially created, or when a marker is inserted. With this solution, the table is accessed only when a packet is received. If a timeout triggered marker insertion is to be used in such solution, its processing will be in combination with the periodic marker insertion.

For systems using a traffic manager (TM), hitless traffic in working and protecting TMs will be switched to working and protecting NNI, respectively, for a specific hitless flow. This can be achieved by either configuring different forwarding tables for the working and protecting TMs, or assigning different headers to the replicated packets. If using different headers, one solution is to add a packet replication feature to the marker insertion block as in FIG. 6, or through another header/address swapping block.

A description will now be given regarding marker format, in accordance with an embodiment of the present principles.

Figure 8:
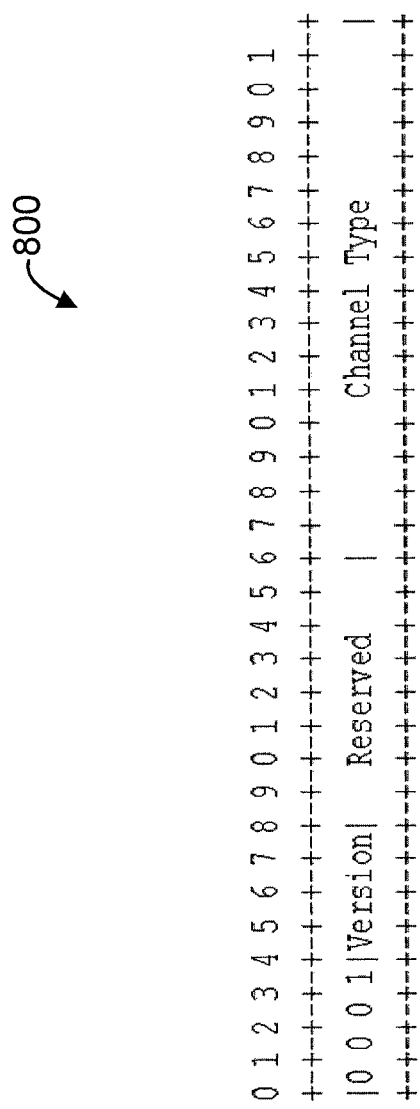
FIG. 8 shows a Psuedo-Wire (PW) Associated Channel Header (ACH) 800 to which the present principles can be applied, in accordance with an embodiment of the present principles.

The next generation transport network will most likely use MPLS-TP over OTN as the main technology. Packets over pseudo-wire (PW) over LSP (label switched path) will be its main encapsulation method. FIG. 7 gives the details about this encapsulation, with Ethernet packet enclosed. FIG. 7 shows a network-network-interface (NNI) data packet format 700 to which the present principles can be applied, in accordance with an embodiment of the present principles. PW header has control word which is identified by 0x0 in the first 4-bit as defined in Internet Engineering Task Force (IETF) Request For Comments (RFC) 4385. A control word (CW) is implemented as the payload data, which in this example is an Ethernet packet including Media Access Control (MAC) header. IETF RFC 4385 also defines PW associated channel, which is "a channel that is multiplexed in the PW with user traffic, and thus follows the same path through the packet switching node (PSN) (such as node C in FIG. 1) as user traffic". The Associated Channel Header (ACH) is defined in FIG. 8. FIG. 8 shows a Psuedo-Wire (PW) Associated Channel Header (ACH) 800 to which the present principles can be applied, in accordance with an embodiment of the present principles. In FIG. 8, 0x1 in the first 4-bit identifies PW ACH, and the channel type field indicates the type of message carried on the associated control channel, which is allocated by IANA "Pseudowire Name Spaces (PWE3)".

Figure 9:
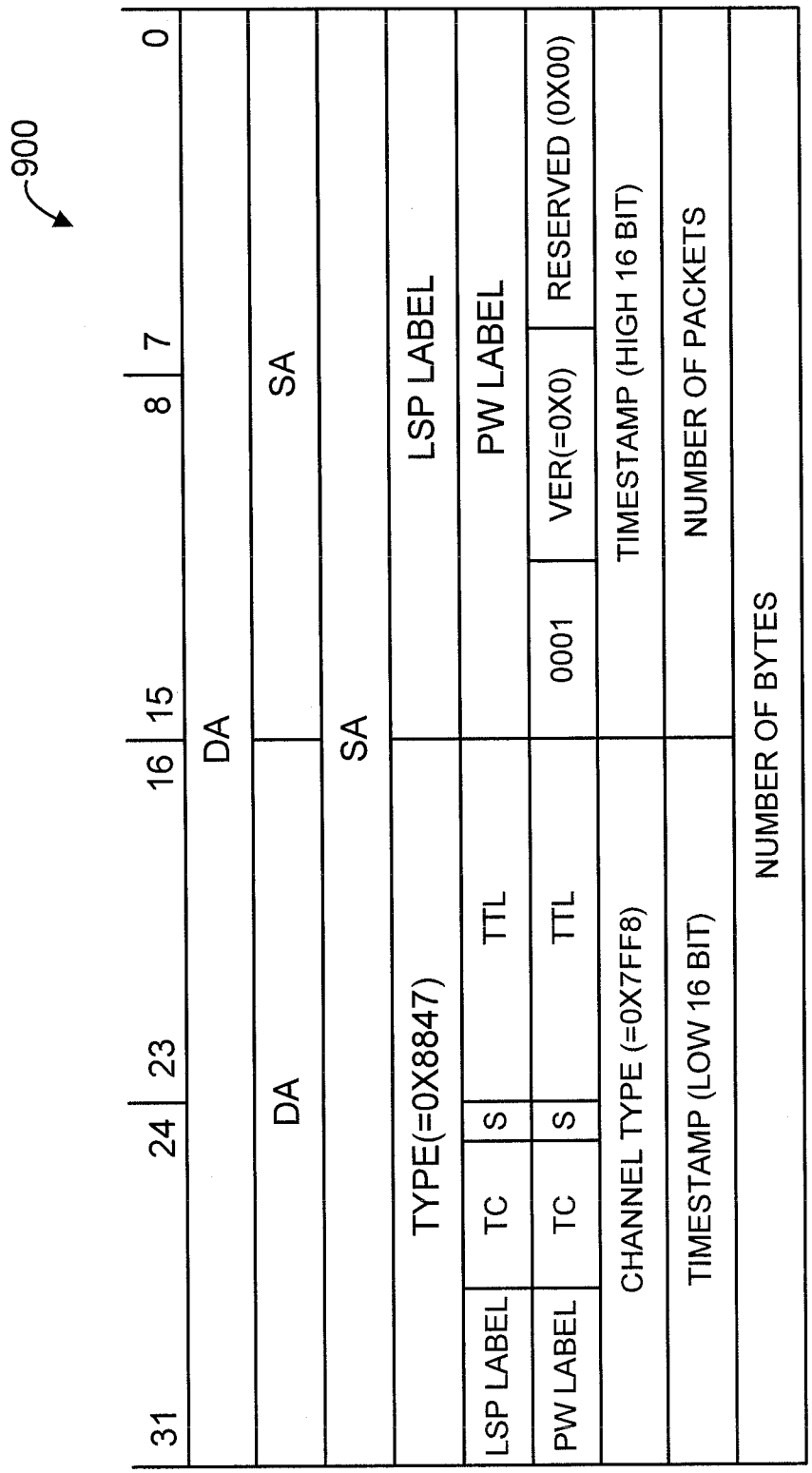
FIG. 9 shows an exemplary marker packet format 900 using Pseudo-Wire (PW) Associated Channel Header (ACH), in accordance with an embodiment of the present principles.

One embodiment for marker packet encapsulation involves using PW ACH, and allocating a dedicated channel type. Alternatively, it may use the Internet Assigned Numbers Authority (IANA) reserved range 0x7FF8~0x7FFF for experimental purpose (IANA "Pseudowire Name Spaces (PWE3)"), to avoid confliction with those assigned or to be assigned, if no official channel type value is to be allocated. FIG. 9 shows an exemplary marker packet format 900 using Pseudo-Wire (PW) Associated Channel Header (ACH), in accordance with an embodiment of the present principles. In FIG. 9, the marker payload includes the timestamp value, number of packets and number of bytes transmitted between the previous and the current marker packet. The timestamp field carries a hitless related timer value generated in the source node or line card. In one embodiment, a sequence number can be used instead. The marker packet may carry "number of packets" or "number of bytes" only, or both. These numbers refer to the packets transmitted from the last marker packet to the present one. LSP and PW labels are the same as data packets.

Figure 11:
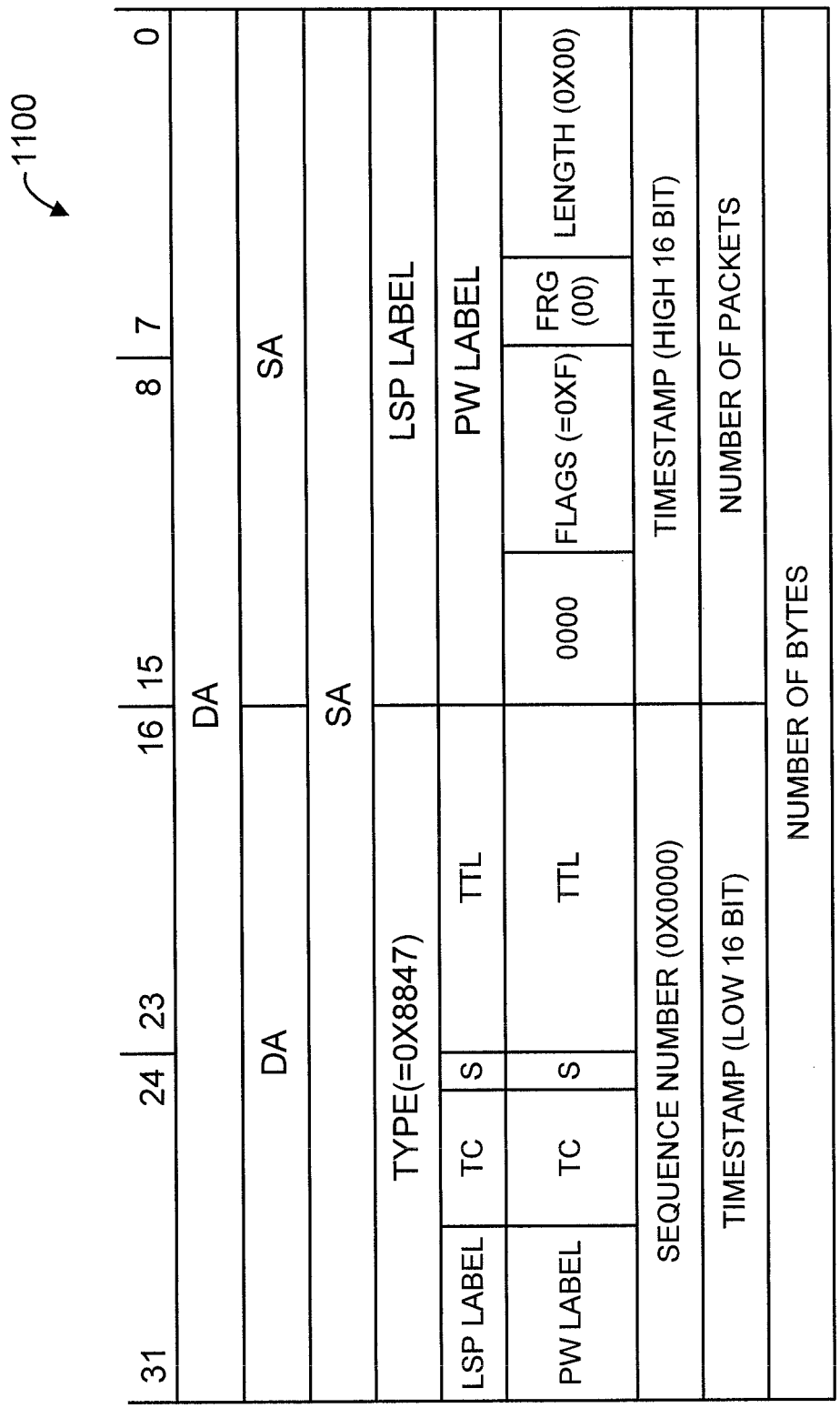
FIG. 11 shows an exemplary marker format 1100 using PW CW, in accordance with an embodiment of the present principles.

One embodiment involves using a PW control word. FIG. 10 shows an exemplary Pseudo-Wire (PW) MPLS control word 1000, in accordance with an embodiment of the present principles. IETF RFC 4385 defines the preferred PW MPLS control word 1000 shown in FIG. 10, where Flags may be used for per-payload signaling. The marker packet may be identified by a specific Flag value, for example 0xF. The advantage of using a control word (in particular, its Flag field) is that it can be differentiated from a PW OAM message by the first 4-bits (which is 0x1 in ACH while 0x0 in CW) only, which simplifies the configuration and processing in PW OAM message trapping. FIG. 11 shows an exemplary marker format 1100 using PW CW, in accordance with an embodiment of the present principles. Alternatively, if the timestamp carried in marker packet is no more than 16-bit, it may use the sequence number field in CW.

Figure 12:
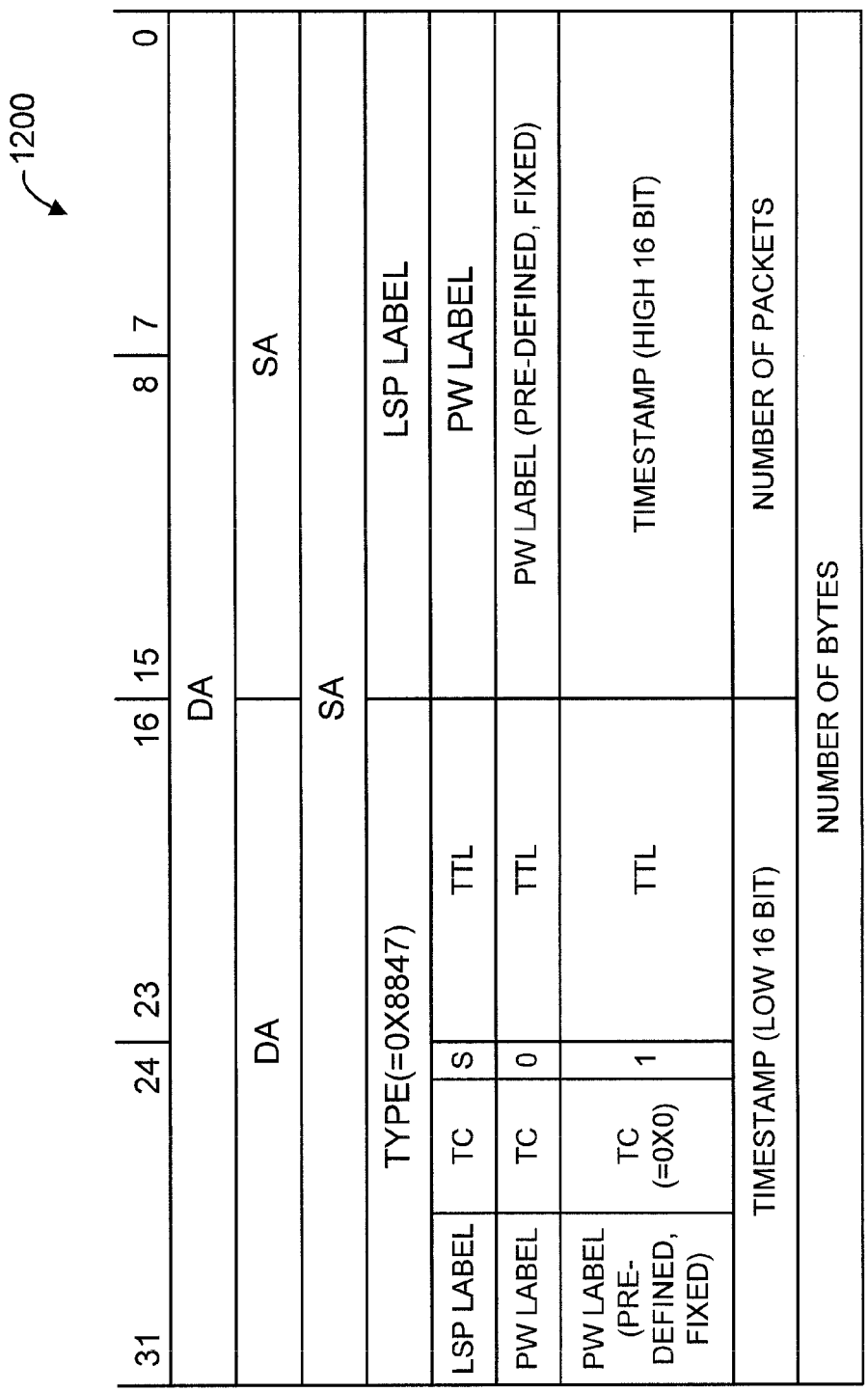
FIG. 12 shows an exemplary marker format 1200 using an inner PW header, in accordance with an embodiment of the present principles.

The above embodiments require either ACH or CW, which further requires CW to be used in data packets. This increases network traffic overhead, because such a header (32 bit) is carried in each packet. If CW is not preferred in the data packets, one embodiment is to add an inner PW header. Within this inner header, the marker packet is identified by either a specific label, or a dedicated TC value. FIG. 12 shows an exemplary marker format 1200 using an inner PW header, in accordance with an embodiment of the present principles.

A description will now be given regarding a destination node operation, in accordance with an embodiment of the present principles.

Hitless traffic from working and protecting paths arrives at the destination node from two different ports. If the two ports are located in the same line card, or the destination node is a pizza box, hitless related processing may be executed either in the input port or the output port (after switching). For a system with multiple line cards and switch fabric, the hitless processing will be executed in the output port. The following discussion assumes output port processing only, though input port processing follows the same procedure except for switching.

As mentioned with respect to the description of an "extended hitless path", hitless traffic is switched through working or protecting fabric, for traffic from the working path or the protecting path, respectively. Since the same input port can be the working one for one flow and the protecting one for another, a table or number to provide such information is necessary. This is based on its flow ID and achieved through table lookup (or from the NP processing result). This table lookup provides the information of whether the received copy is from the working path or the protecting path, if it belongs to a hitless flow. After switching, both copies reach the same destination line card.

For each hitless flow, the destination node checks the consistency between the number of packets/bytes received and the information carried in the corresponding marker. To reduce logic consumption, a table can be used to save the collected information for each flow. This table is indexed by a hitless flow number (usually generated by the NP, or from the packet label), and includes the number of packet/bytes received for the current marker period. Whenever a hitless flow is created, these entries are initialized with zeros. When a hitless data packet is received, the corresponding entry will be updated. If a marker packet is received, it compares the information carried in the marker packet with those saved in the table, to generate the checking result. The checking result is used to determine packet loss or path failure, and to make the protecting decision.

A description will now be given regarding the operation related to traffic selection in the destination node.

The description of the operation related to traffic selection in the destination node will commence with a description of the protecting nodes.

For administrative purpose, hitless protection shall support the options of manual switching, automatic switching, forced switching, and lockout mode. The following defines the operation of each mode:

(1) Manual switch: to switch either from the working path to the protecting path or the protecting to the working path, under administrative command. This is only relevant if there is no currently active fault condition or operator command.

(2) Automatic switch: in case failure is detected, to automatically switch to the functional path.

(3) Forced switch: switching to the protection path as administrative command. This is similar to manual switching with higher priority.

Lockout of protection: the protection path is disabled as a result of administrative command.

Among these 4 operational modes, assume the priority is defined as (1=top priority, 4=lowest priority): 1—Lockout; 2—Forced switching; 3—Automatic switching; and 4—Manual switching. Under manual switching, if a failure is detected, the system will still switch to the functional path, while in the forced switching mode, it stays in the current state irrespective of whether or not the path is functional. The protecting mode is carried out in the destination node where hitless service is eventually delivered.

Figure 13:
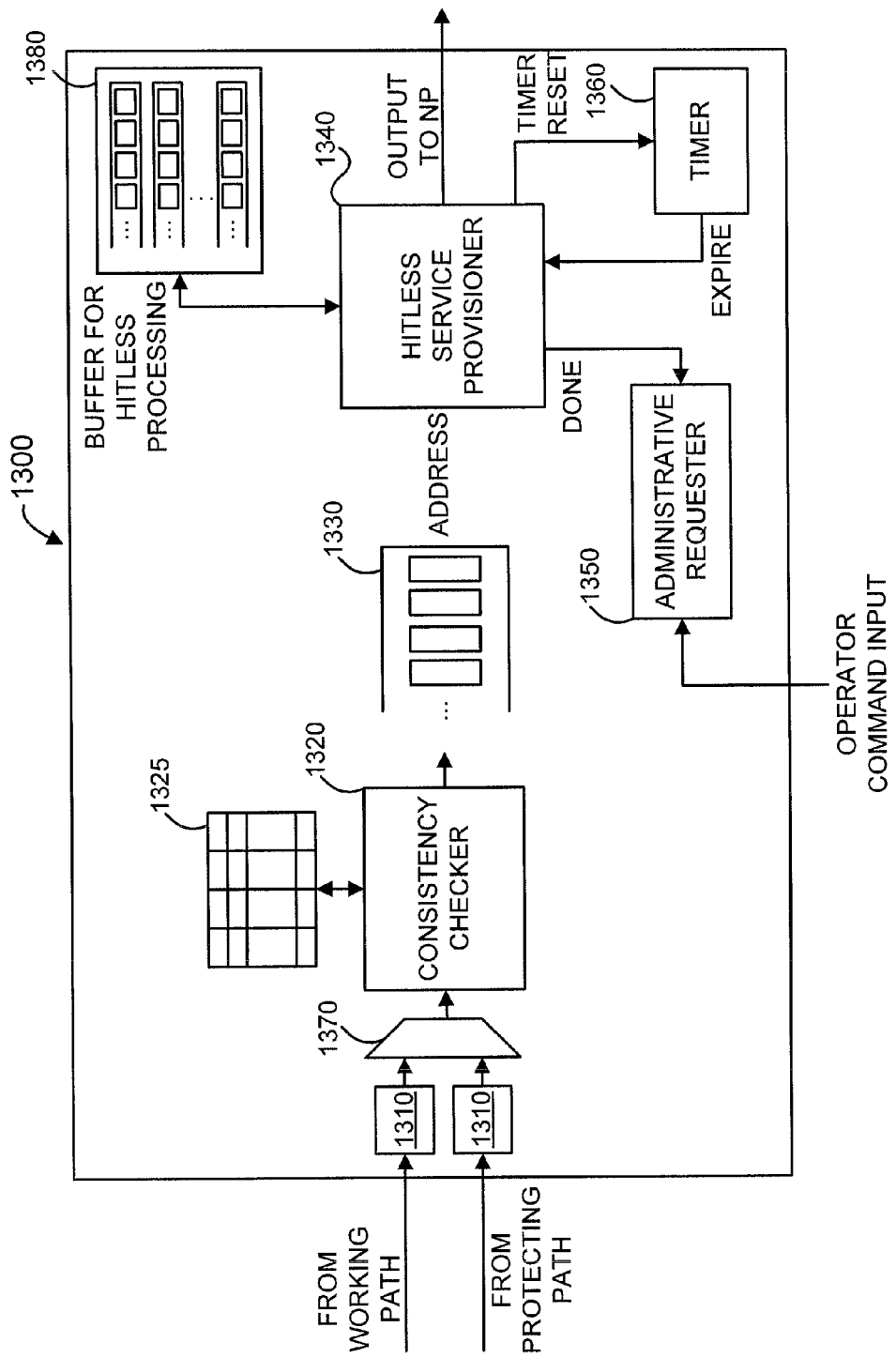
FIG. 13 shows a destination node hitless processing device 1300, in accordance with an embodiment of the present principles.

FIG. 13 shows a destination node hitless processing device 1300, in accordance with an embodiment of the present principles. The device is for the processing of hitless flow only. Taggers 1310 are present at the input of the device 1300, to identify whether the packet is received from the working path or the protecting path. The outputs of the taggers 1310 are provided to a multiplexer (mux) 1370. A consistency checker 1320 detects packet loss and/or path failure as mentioned above. Its associated flow table 1325 stores the temporary information for each flow during the consistency check. Packets together with the checking result are written into a FIFO 1330 which is further read by hitless service provisioner 1340 (also interchangeably referred to a hitless packet processor), which selects the desired packets to assure hitless protection, based on a consistency checking result. An administrative requester 1350 accepts an operator command input, and interacts with hitless service provisioning block to have the command executed. A timer 1360 maintains the timer of each flow, and monitors whether a particular flow has timer expired. A buffer 1380 is provided for hitless processing.

A description will now be given of the hitless service provisioner 1340, in accordance with an embodiment of the present principles.

The hitless service provisioner 1340 accepts packets input, and makes selection for the desired output based on each flow's status and administrative input. Flow status is obtained by monitoring the checking result together with timer input information.

A description will now be given of the data structure relating to the hitless service provisioner 1340, in accordance with an embodiment of the present principles.

Figure 14:
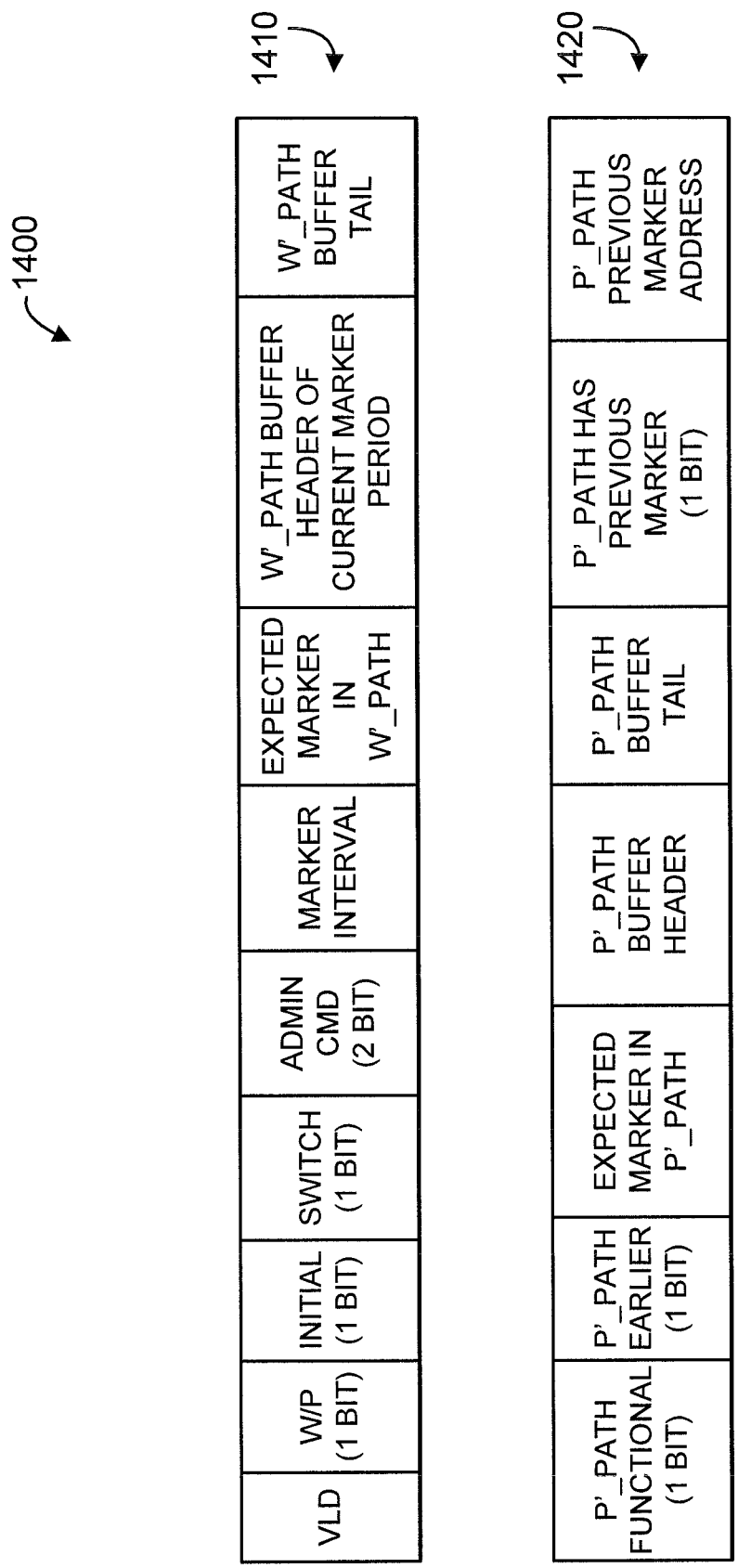
FIG. 14 shows a destination node hitless packet processing related table 1400, in accordance with an embodiment of the present principles.

Inside the hitless service provisioner 1340, the state of each flow is maintained in a table, called hitless processing table. FIG. 14 shows a destination node hitless packet processing related table 1400, in accordance with an embodiment of the present principles. The table 1400 has two entries: one named "active path entry" 1410 which saves both the overall flow information and the active path related flow information; and the other named "alternative path entry" 1420 which stores the inactive (standby) path related flow information. It is indexed by the packet flow ID (or label). A "valid" bit indicates whether the indexed entry is valid or not; "initial" bit identifies whether the table is in normal operation ('0') or just initialized ('1').

To have identical processing for either the working path or the protecting path as the current active path which may simplify the implementation, each flow has one bit in its table entry to identify the current selection, where a "0" is for the working path while a "1" is for the protecting path. The packet tag bit mentioned above is xnor-ed (!xor) with this bit to identify whether the current packet belongs to the current active path ("1") or an inactive path ("0"), which are further named W'_path and P'_path, respectively, in the packet processor.

When a flow is initially created, the "initial" bit is set to a "1", and the packet processor waits for a marker from the W'_path for that flow. Upon the detection of a marker packet from the W'_path, it sets expected marker field and clears the "initial" bit, to enable the state machine to return to a normal state.

The marker interval is used to calculate the next expected marker timestamp from a received marker packet, which is used when the marker includes a timestamp rather than sequence number. The value shall be consistent with that in the source node. Expected marker refers to the timestamp carried in the marker packet which is expected by the packet processor. If the sequence number is used instead, only the expected marker field will be needed, for the next expected marker sequence number.

Since packet correctness can only be obtained when the next marker packet is received, data packets from the W'_path shall be buffered. Since the working path and the protecting path are treated equally in processing flow, a packet from the P'_path might come earlier than from the W'_path, and these earlier packets shall be buffered (in buffer 1380) in case the packet processor needs to switch to the other path (i.e., make the current P'_path as the next W'_path). This buffer(s) can be accessed with the pointers "W'/P'_path buffer header/tail" fields in the table entry. One bit "P'_path earlier" is used to notify that packets received from P'_path are earlier than W'_path, which means the P'_path buffer is not empty. When this field is valid ("1"), at least one packet is stored in the packet buffer, which can be accessed by a buffer header and a tail pointer in the table entry. The packet buffer 1380 can be either on-chip or off-chip.

If packet forward latency is critical, the packet processor may send out the packet right after it is received from the active path, without waiting to know whether the packets in the current marker time slot are all received or not. In the case of a path failure, which can be detected upon a timeout, the packet processor switches to the other path from the estimated packet, which can be obtained by adding another field num_of_pkt_sent in the active path entry, increment by 1 when a packet is sent, and cleared to zero when the marker is received. The following description will consider a packet transmitted only after the marker is received, though some embodiments apply to both cases.

When configured to automatic switching, if the current active path fails, the automatic switching happens only when the other path is fully functional. Thus, the packet processor shall monitor the status of the P'_path. The monitored status is saved in the P'_path functional field.

If packets from the P'_path are earlier than the W'_path, whenever a marker is received correctly from the W'_path, the packets of the corresponding marker slot saved from the P'_path will be released.

A description will now be given regarding the hitless packet processor (hitless service provisioner 1340), in accordance with an embodiment of the present principles.

Figure 15:
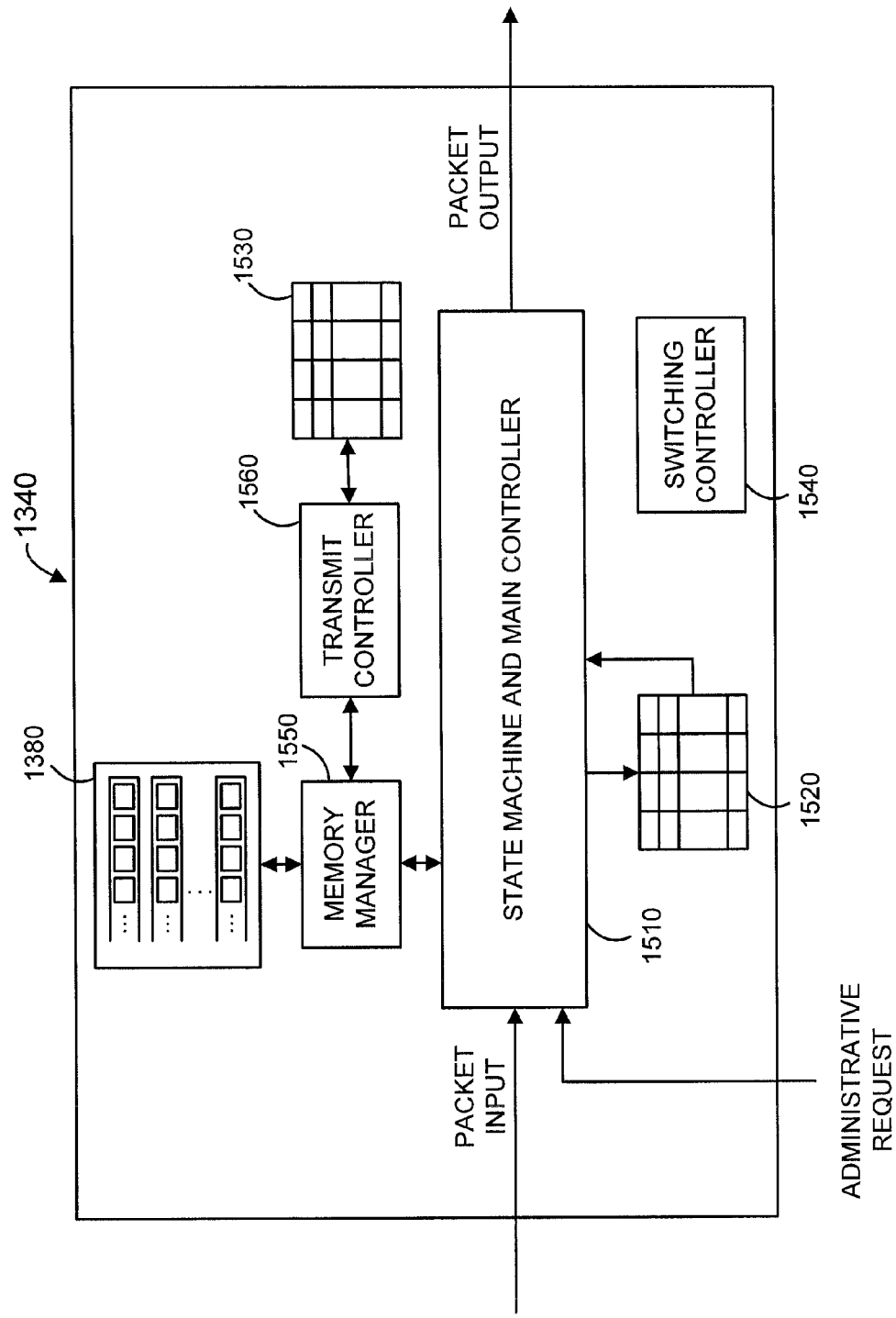
FIG. 15 further shows the hitless packet processor 1340 of FIG. 13, in accordance with an embodiment of the present principles.

FIG. 15 further shows the hitless packet processor 1340 of FIG. 13, in accordance with an embodiment of the present principles. As noted above, the phrases "hitless packet processor" and "hitless service provisioner" 1340 are used interchangeably herein. The hitless packet processor 1340 includes a state machine and main controller 1510 (referred to as the "main controller" thereafter), which maintains the state machine and the data structure based on both packet and administrative input. Other elements include the following: a hitless packet processing table 1520 as introduced above, for the main data structure in packet processor; a transmit table 1530 for a transmit buffer, which saves the ending timestamp for the flows that have data to be transmitted (i.e., packet correctness has been verified by the corresponding marker); a switching controller 1540, to identify which flow is currently under protection switching (i.e., in the process of converting P'_path to W'_path); and a memory manager 1550, to maintain the packet buffer 1380.

Figure 16:
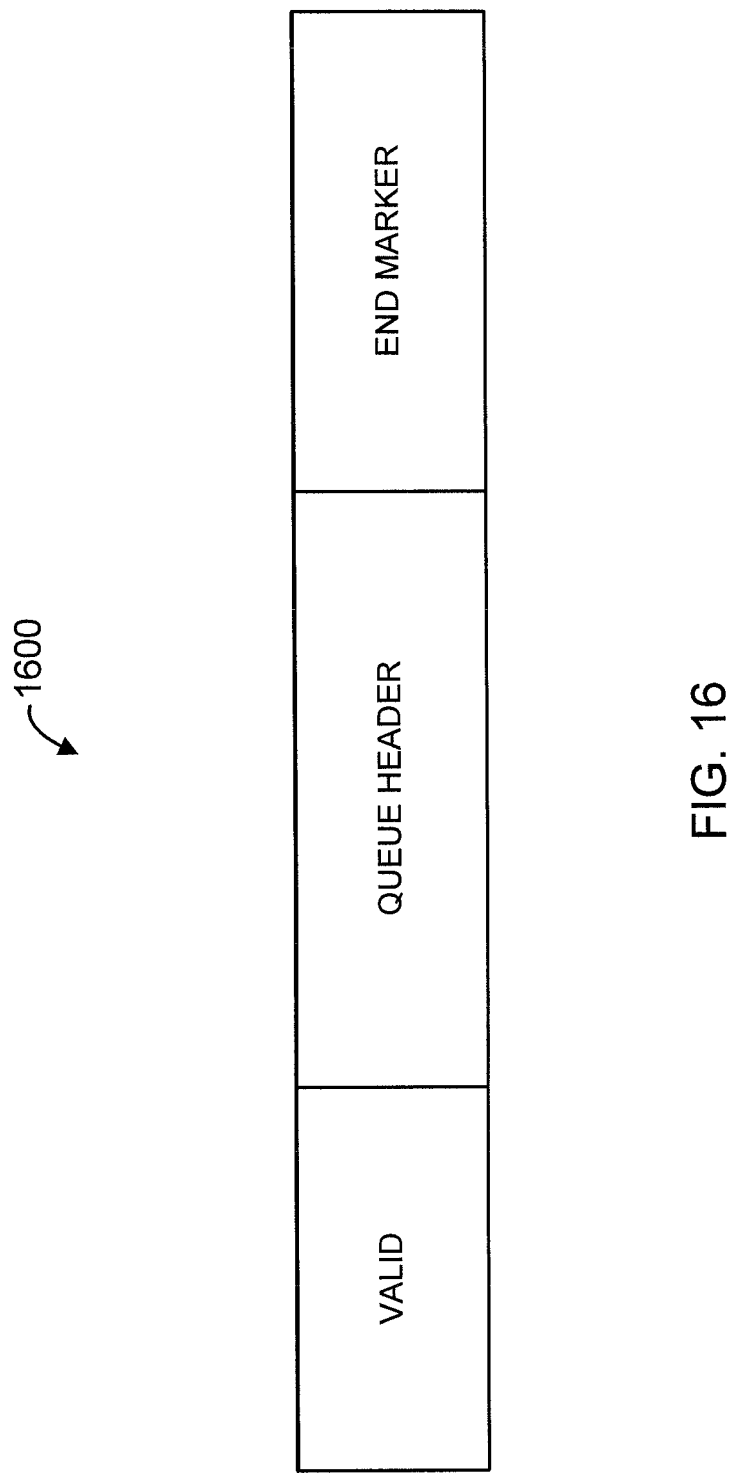
FIG. 16 shows an exemplary transmit table format 1600, in accordance with an embodiment of the present principles.

When a data packet from the W'_path is received, because its correctness has not been verified until receipt of the subsequent marker (here it refers to the result outputted from the consistency checker 1320. The same term is used in the following description), it will be stored in the working buffer. Whenever an expected and correct marker is received, the buffered packets from the corresponding W'_path can be transmitted, by notifying the transmit controller. A transmit controller 1560 maintains the transmission queue for each flow in the transmit table 1530. FIG. 16 shows an exemplary transmit table format 1600, in accordance with an embodiment of the present principles. The transmit table format 1600 includes the following: a "valid" field that indicates whether there are any packets to be transmitted; a queue header gives the access pointer to the start of the transmission queue; and an end marker gives the marker timestamp that indicates the end of transmission slot. Alternatively, the timestamp can be remapped to a local sequence number for a reduced number of bits. The transmit controller 1560 continuously goes through the transmit table to check whether any flow has packets to be transmitted, and outputs in round-robin mode for each flow. If there is any flow with packets to be transmitted, it outputs one packet and moves to the next available flow. If a read out packet from a queue matches its end marker, which means all the checked packets have been sent, it will mark "valid" field to zero. Other methods can also be used for this output scheduling, while maintaining the spirit of the present principles.

When a network path fails, it might affect several hitless flows in the same destination node, so multiple hitless flows may need to be switched from the W'_path to the P'_path. The switching controller 1540 maintains these flows that are being switched. Its associated table is the same as the transmit table format 1600 shown and described with respect to FIG. 16. When a flow is to be switched, it is initiated by the main controller 1510. The P'_path header and end_marker are copied from the packet processing table to the switching table, and a "valid" bit in the corresponding entry in switching table is set to "1". Then it sets the "switching" flag for that flow in the packet processing table 1520. When the "switching" flag is valid, it temporally stops the particular flow's packet receiving from the W'_path, while continuing the previous operation for the P'_path, except that when a marker is received from the P'_path, it updates the end_marker field in the switching table. The switching controller 1540 continuously goes through its table and generates request for the flow in the switching state to the transmit controller 1560. When the transmit controller 1560 does not have a packet to transmit from that flow, it takes over the information from switching controller 1540 and notifies the main controller 1510 that the path switching has finished, so that the main controller 1510 can toggle a W/P bit, clear the "switching" flag, and enters the normal operating stage for that flow. Alternatively, when the transmit controller 1560 finds one queue empty, it may check with the switching controller 1540 for whether that queue is in a switching state, but special handling shall be taken to avoid a flow to enter deadlock. An example case is that a flow does not have any packet in a transmit buffer, but it is turned into a switching state.

A description will now be given of a processing procedure, in accordance with an embodiment of the present principles.

The processing procedure refers to the high-level processing sequence among the main controller 1510, the transmit controller 1560, and the switching controller 1540. The whole processing is controlled by the main controller 1510. For each operating cycle, it takes the following steps one by one: (1) checks administrative input and responses if any request; (2) receives and processes one packet from input if any; (3) lets the transmit controller 1560 send out one packet; 4) the transmit controller 1560 accepts one switching request if any. Besides the given operation, it also checks "timer expire" input from timer 1360, to trigger protection switching.

In terms of realization, if such step-by-step scheme causes unexpected delay or overflow, it can be optimized by allowing multiple packets in one cycle with a certain algorithm. For example, if the packets to be transmitted are all short packets while the received packets are long ones, it may cause overflow in the input FIFO 1330 if each cycle allows one packet to be transmitted and received.

A description will now be given of several novel aspects of the present principles.

Hitless protection is end-to-end or edge-to-edge. The hitless related operation only happens at the end nodes (source and destination). Intermediate nodes transparently forward the packets without special processing.

A marker packet is used in hitless protection, which is generated in the source node and used in the destination node, to determine packet loss.

The marker packet is encapsulated in pseudo-wire (PW) over an MPLS-TP frame, identified by either a control word (CW), or Associated Channel Header (ACH), or inner PW label, or inner PW traffic class (TC).

The marker packet is generated either periodically or based on the number of packets transmitted.

The hitless path is extended from a source line card of a source node, to a destination line card of a destination node, by using switch fabric in 1+1 mode, and having one (or one set of) fabric included/dedicated for the working path, and the other one (or one set of) fabric included/dedicated for the protecting path.

The switch fabric is configured separately for hitless traffic and regular traffic, to use in a hybrid mode, where hitless uses it as 1+1 mode, while regular traffic uses it as either 1+1, or 1:1, or 1:n, or load balanced mode, which is achieved by using different destination port space.

A description will now be given regarding features of the present principles in relation to their advantages over the prior art.

The source line card replicates the hitless traffic, inserts a marker for each copy, and sends each copy to an interface connected to either the working path or the protecting path.

The marker packets have the same forwarding header (for example, but not limited to, an outer label) as corresponding data packets, to keep the same forwarding path and sequence.

The destination hitless device checks the received data packets with their accompanying marker packet, to decide packet loss. Path failure is also detected by setting a timer and detecting timeout if no packet is received for the predefined period.

Based on the detection result, the destination hitless device either stays with the active path, or compensates packets from the standby path, or switches to the standby path.

The switch fabric is configured in 1+1 mode for hitless traffic. Fabric routing is configured to pass the working copy to the (dedicated) working fabric, and the protecting copy to the (dedicated) protecting fabric. This configuration extends the hitless path to beyond the switch fabric in the source and destination nodes.

Figure 17:
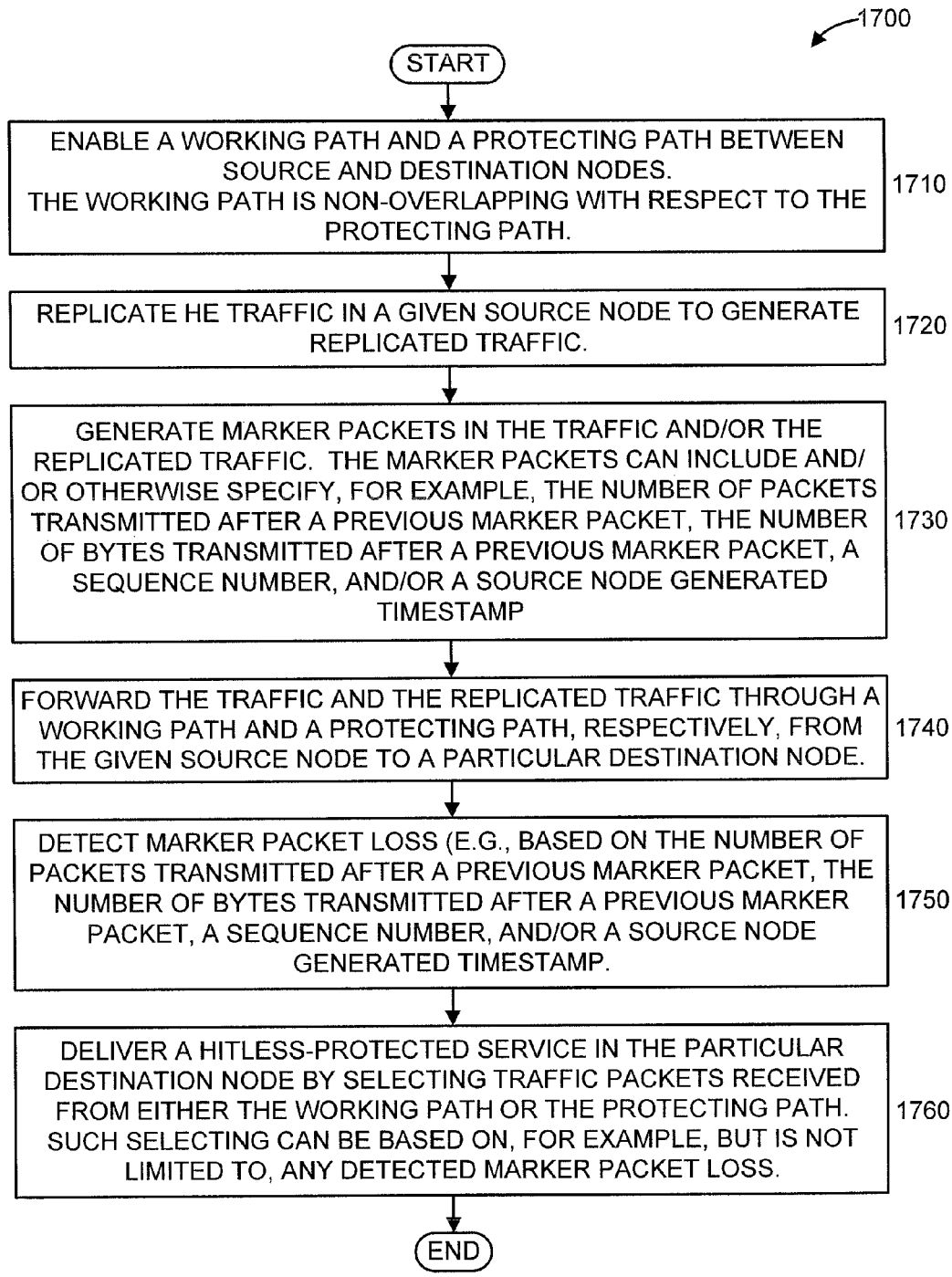
FIG. 17 shows a method 1700 for end-to-end hitless protection in packet switched networks, in accordance with an embodiment of the present principles.

FIG. 17 shows a method 1700 for end-to-end hitless protection in packet switched networks, in accordance with an embodiment of the present principles.

At step 1710, enable a working path and a protecting path between the source and destination nodes. The working path is non-overlapping with respect to the protecting path.

At step 1720, replicate traffic in a given source node to generate replicated traffic.

At step 1730, generate marker packets in the traffic and/or the replicated traffic. The marker packets can include and/or otherwise specify, for example, the number of packets transmitted after a previous marker packet, the number of bytes transmitted after a previous marker packet, a sequence number, and/or a source node generated timestamp.

At step 1740, forward the traffic and the replicated traffic through a working path and a protecting path, respectively, from the given source node to a particular destination node.

At step 1750, detect marker packet loss. Such marker packet loss can be based on, for example, but is not limited to, the number of packets transmitted after a previous marker packet, the number of bytes transmitted after a previous marker packet, a sequence number and/or a source node generated timestamp.

At step 1760, deliver a hitless-protected service in the particular destination node by selecting traffic packets received from either the working path or the protecting path. Such selecting can be based on, for example, but is not limited to, any detected marker packet loss.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims.

Having thus described aspects of the invention, with the details and particularity required by the patent laws, what is claimed and desired protected by Letters Patent is set forth in the appended claims.

What is claimed is:

1. A method for providing hitless protection in a packet switched network having source nodes and destination nodes, the method comprising:

enabling a working path and a protecting path between the source and destination nodes, the working path being non-overlapping with respect to the protecting path;

replicating traffic in a given one of the source nodes to generate replicated traffic;

forwarding the traffic and the replicated traffic through the working path and the protecting path, respectively, from the given one of the source nodes to a particular one of the destination nodes;

delivering a hitless-protected service in the particular one of the destination nodes by selecting traffic packets received from either the working path or the protecting path;

checking whether an expected one of marker packets has been received by the particular one of the destination nodes, wherein in addition to traffic replication, the given one of the source nodes also inserts the maker packets in at least one of the traffic and the replicated traffic;

checking the marker to determine whether an intended transmission has occurred between the given one of the source nodes and the particular one of the destination nodes using one of the working path and the protecting path, when the expected one of the marker packets has been received by the particular one of the destination nodes;

using packets from the one of the working path and the protecting path when the intended transmission has occurred; and using packets from another one of the working path and the protecting path when the intended transmission has failed to occur.

2. The method of claim 1, wherein said replicating step sends the traffic and the replicated traffic through different physical ports in the given one of the source nodes.

3. The method of claim 1, wherein the working path and the protecting path are configured using different packet headers or using different forwarding tables for nodes in each of the working path and the protecting path.

4. The method of claim 1, wherein in the particular one of the destination nodes, the working path and the protecting path are configured as an active path and a standby path, with the traffic normally selected from the active path, and compensated by the standby path when a packet loss is detected, or changes from the active path to the standby path when the active path fails.

5. The method of claim 1, wherein the traffic and the replicated traffic include data packets and the marker packets, respective ones of the marker packets having a same deterministic header as corresponding ones of the data packets to ensure that the respective ones of the marker packets follow respective same paths and sequences as the corresponding ones of the data packets to reach the particular one of the destination nodes.

6. The method of claim 1, wherein the marker packets are generated periodically.

7. The method of claim 6, wherein at least some of the marker packets specify at least one of a number of packets and a number of bytes transmitted after a previous one of the marker packets.

8. The method of claim 1, wherein the marker packets are inserted when a number of packets reaches a pre-defined threshold number of packets or when a number of bytes reaches a pre-defined threshold number of bytes.

9. The method of claim 1, wherein the marker packets are inserted in a particular output line card of a particular one of the source nodes, and a synchronization method synchronizes the particular output line card with one or more other output line cards connecting the working path and the protecting path.

10. The method of claim 1, wherein the traffic and the replicated traffic comprise respective packet streams encapsulated in a Multi-Protocol Label Switching-Transport Profile frame or a pseudo-wire over the Multi-Protocol Label Switching-Transport Profile frame, and the marker packets are identified by an associated channel header of a particular channel type.

11. The method of claim 1, wherein the traffic and the replicated traffic comprise respective packet streams encapsulated in a Multi-Protocol Label Switching-Transport Profile frame or a pseudo-wire over the Multi-Protocol Label Switching-Transport Profile frame, and the marker packets are identified by a control word or a specific flag value.

12. The method of claim 1, wherein the traffic and the replicated traffic comprise respective packet streams encapsulated in a Multi-Protocol Label Switching-Transport Profile frame or a pseudo-wire over the Multi-Protocol Label Switching-Transport Profile frame, and the marker packets are identified by a specific label value in a last header of a label stack or a particular traffic class value.

13. The method of claim 1, wherein the marker packets include a sequence number or a source node generated timestamp to align packets from the working path and the protecting path at the particular one of the destination nodes.

14. The method of claim 13, further comprising detecting marker packet loss based on the sequence number or the source node generated timestamp.

15. The method of claim 1, wherein each of the marker packets represent a respective marker time period, and the packets from the one of the working path and the protecting path corresponding to the time period are replaced with the packets from the other one of the working path and the protecting path corresponding to the respective marker time period when a failure of the intended transmission is due to packet loss.

16. The method of claim 1, wherein each of the marker packets represent a respective marker time period, and the particular one of the destination nodes switches to the other one of the working path and the protecting path at a beginning of the expected marker time period when a failure of the intended transmission is due to path failure.

17. A system for providing hitless protection in a packet switched network having source nodes and destination nodes, the system comprising:
- a working path and a protecting path between the source and destination nodes, the working path being non-overlapping with respect to the protecting path;
- a source node located traffic replicator for replicating traffic in a given one of the source nodes to generate replicated traffic;
- one or more source node line cards for forwarding the traffic and the replicated traffic through the working path and the protecting path, respectively, from the given one of the source nodes to a particular one of the destination nodes; and
- one or more destination node line cards for delivering a hitless-protected service in the particular one of the destination nodes by selecting traffic packets received from either the working path or the protecting path;
- wherein in addition to traffic replication, the given one of the source nodes also inserts maker packets in at least one of the traffic and the replicated traffic;
- wherein there is a check for whether an expected one of the marker packets has been received by the particular one of the destination nodes;
- wherein there is a check of the marker to determine whether an intended transmission has occurred between the given one of the source nodes and the particular one of the destination nodes using one of the working path and the protecting path, when the expected one of the marker packets has been received by the particular one of the destination nodes;
- wherein there is a using of packets from the one of the working path and the protecting path when the intended transmission has occurred; and
- wherein there is a using of packets from another one of the working path and the protecting path when the intended transmission has failed to occur.

18. The system of claim 17, further comprising:
- at least one working path switch fabric dedicated to the working path; and
- at least one protecting path switch fabric dedicated to the protecting path,
- wherein the traffic uses the working path switch fabric and the protecting path switch fabric in a 1:1 mode or a 1+1 mode,
- wherein in the 1:1 mode, one of the working path switch fabric and the protecting path switch fabric is in an active state and another one of the working path switch fabric and the protecting path switch fabric is in a standby state, and
- wherein in the 1+1 mode, the working path switch fabric and the protecting path switch fabric are treated equally.

* * * * *